Oct. 20, 1953 C. G. SIBBLE 2,655,731
LOST MOTION MEASURING TOOL
Filed June 12, 1952
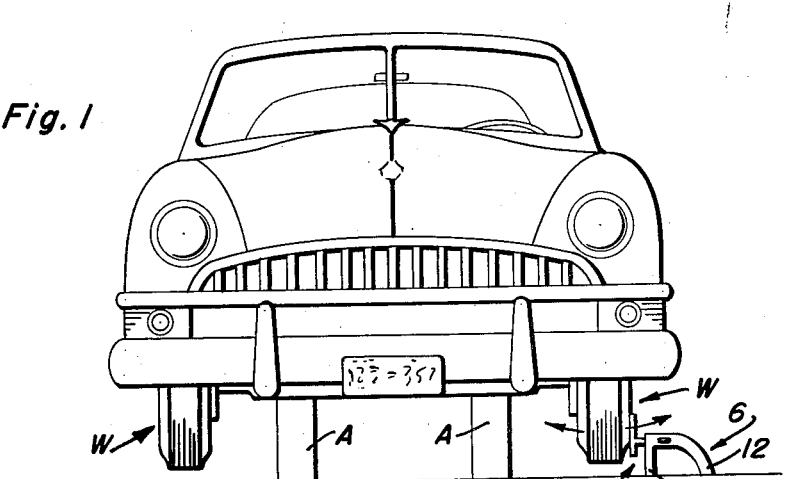
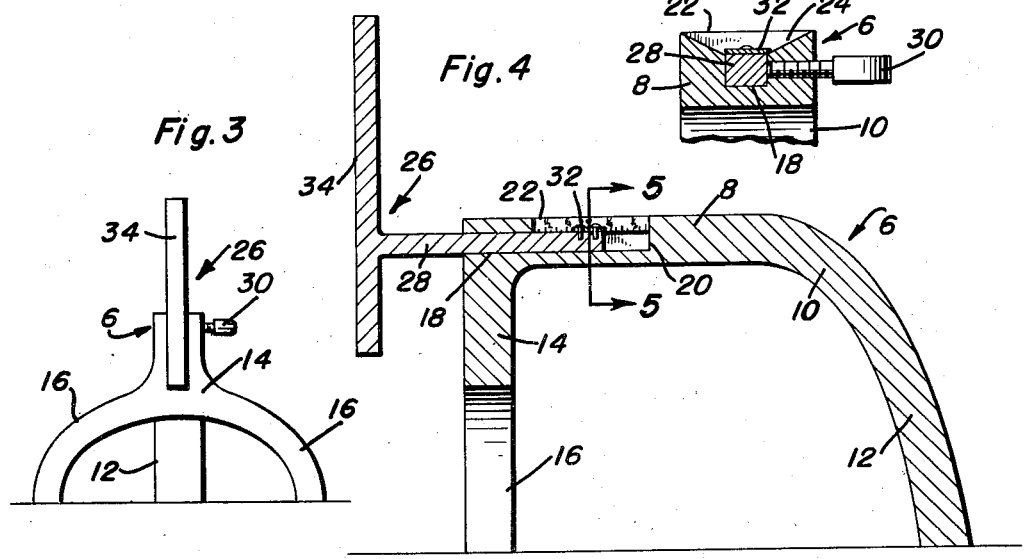
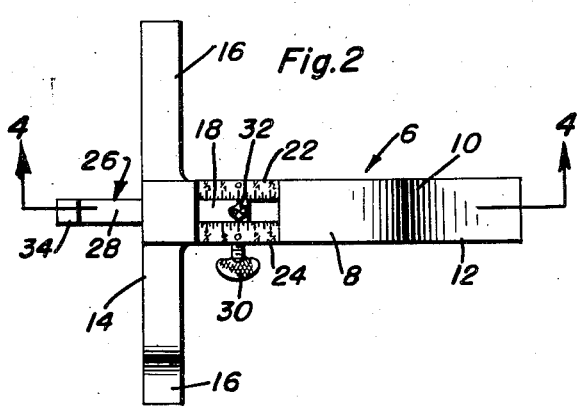
Carl G. Sibble
INVENTOR.

Patented Oct. 20, 1953

2,655,731

UNITED STATES PATENT OFFICE 2,655,731

LOST MOTION MEASURING TOOL

Carl G. Sibble, Tionesta, Pa.

Application June 12, 1952, Serial No. 293,181

2 Claims. (Cl. 33—169)

The present invention relates to automotive tools, testing and gaging devices and has more particular reference to a portable hand tool which is expressly designed and properly adapted to enable one, usually an automobile mechanic, to ascertain the approximate degree of play or lost motion existing in a vehicle wheel mounting.

State inspection requirements in many States allow maximum play or lost motion ranging one-half inch more or less and in many States the maximum allowance is one-quarter of an inch. The individual who conducts or makes the test is usually called upon to jack up the vehicle and to catch hold of the wheel at top and bottom portions and to wobble it either in or out. In so doing it is possible for one skilled in this line of duty to be able to detect the approximate lost motion resulting from spindle wear, wear of the bushings or bearings, as the case may be. The purpose of the present invention is to provide a more reliable ways and means of attending to this checking step and, in so doing, a simple, practical and economical tool has been evolved and produced.

It will be evident from the foregoing that the present invention, therefore, relates to certain new and useful improvements in lost motion testing tools and has to do with one which is unique, easy to handle and reliable in ascertaining the information desired.

In carrying out the invention a frame, which takes the form of a small heavy stand, is employed. This is provided with several legs to rest on the ground or other surface. It is also provided with an extensible and retractable measuring member which cooperates, through the medium of an indicator, with suitably provided scales, making it possible to rest the member against a surface of the wheel and to actuate the wheel, while jacked, in such a manner as to check king pin wear in order that repairs, if needed, may be adequately taken care of and in this manner to promote greater safety and to eliminate abnormal tire tread wear.

Other objects, features and advantages will become more readily apparent from the following description and the accompanying of illustrative drawings.

In the drawings, wherein like numerals are employed to designate like parts throughout the views:

Figure 1 is a front elevation showing an automobile jacked up and showing the manner in which the gage or tool is applied to take the desired measurement.

Figure 2 is a top plan view of the tool by itself, this on an enlarged scale.

Figure 3 is a front end elevation, that is, a view observing the tool in a direction from left to right in the drawings.

Figure 4 is a central vertical section taken on the plane of the line 4—4 of Figure 2 looking in the direction of the arrows.

Figure 5 is an enlarged cross section taken on the vertical line 5—5 of Figure 4, looking in the direction of the arrows.

The over-all instrumentality or tool is characterized, as is evident, by two essential components. The main frame unit is denoted by the numeral 6 and this has been variously classed either as a stand or base. It is preferably a heavy metal casting which stays put once it is set in the position in the manner shown for example in Figure 1. It is also, by preference, a triple-leg construction. It comprises, therefore, a horizontal bar member 8 with a curved bend at one end as at 10, terminating in what may be called an outer leg 12. At the forward end of the bar member is a depending or vertical yoke 14 having downwardly curving properly balanced and self-standing legs 16. If it is desired to hold the foot on the stand while making the test the flat surface 8 will be advantageous as is obvious. The left-hand end of the bar member is formed with a polygonal bore 18 which functions as a socket. The socket opens through the left hand end of the stand and it is closed at the right-hand end as at 20 in Figure 4. There is also a recess which communicates with the socket and this is what may be called a sight opening. The sight opening has its lengthwise marginal edges beveled and calibrated to provide selectively usable suitably graduated scales 22 and 24 conveniently readable from either side of the sight opening. The complemental unit 26 is substantially T-shaped. The stem portion is polygonal in cross section as at 28 and is telescopically and slidably mounted in the socket and works in and out by hand adjustment. It is held in a set position by way of a suitably mounted and cooperating setscrew as at 30. That portion which is exposed in the sight opening is provided with a suitable indicator 32 whose pointed ends cooperate with the graduations on the scales 22 or 24, as the case may be. The head portion is denoted by the numeral 34 and it is vertically disposed and provides an abutment which is engaged with the side wall of the wheel W in the manner shown. The stem portion with its index cooperating with the scales functions as a sort of a measuring ruler, as it were.

To use the device or tool it is necessary to put floor jacks A underneath the motor vehicle and to raise the front wheels off of the floor some one or two inches. Then, the next thing to do is tighten the setscrew 30 in order that the index means 32 will be opposite the zero notations on the respective scales 22 and 24. Then the stand is placed on the floor with the vertical abutment head 34 bearing against the outside of the vehicle wheel. After loosening the setscrew the user simply grasps the wheel at top and bottom portions and moves the wheel either in or out. This means that the slidable T member 26 will, through the medium of the indicating arrows and scale markings, register the amount of wear of the worn king pin bolts, bushings or bearings. The result will enable the user to determine whether the wheel is safe for continued use or if tightening adjustments or repairs are advisable.

The main frame 6, being of triple leg construction, permits it to set firmly and rigidly on uneven garage or shop floors that are not level.

After the tool has been used to measure the amount of wear in spindle bolts, bushings, bearings, etc., a small hand jack (not shown) should be placed or set between wheel (W) and floor jacks A about 2" or 3" from inside wheel (W) with top of small hand jack under lower suspension arm. Now, raise lower suspension arm to compress coil spring until front independent wheel suspension parts are free. Set gauge as before and move either "in" or "out" and the tool will measure the amount of wear in the pins, bolts, bushings and arms of the independent front wheel suspension systems used in nearly all late model automobiles. This last step is used only on automobiles that have independent front wheel suspension systems.

The construction is quite simple in form and requires no mechanical knowledge to understand its use. The readings are in plain view, easily read and may be depended upon as reliable clues for needed adjustment service.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A measuring tool to detect and ascertain undue lost motion and play in a mounted vehicle wheel comprising a tripodal stand, of prescribed mass and heaviness so that once it is set in a position on the floor close to the wheel to be measured it will be in position during the measuring operation, said stand embodying a horizontal bar member with a curved bend at one end defining a leg and provided at its end with a vertical yoke embodying downwardly curving additional legs, the several legs serving to adequately support the stand in a reliably usable position on inclined surfaces or slightly uneven surfaces, said bar member being provided with a polygonal bore opening at one end through the bar member and providing a socket, said bar member having a recess embodying a slot opening into the socket and embodying converging bevelled edges, the bevelled edges being graduated and providing selectively usable scales, a substantially T-shaped member including a horizontal stem portion corresponding in cross-section with the socket and slidable but non-rotatable in the socket and having indicator means cooperating with the graduations on the scales, the head portion being vertically disposed and being adapted to abut a cooperating surface of the wheel which is to be checked.

2. A measuring tool to detect and ascertain undue lost motion and play in a mounted vehicle wheel comprising a tripodal stand of predetermined mass and consequent heaviness adapted to set in a firm and reliable position on the floor close to the wheel to be measured, said stand embodying a vertical inverted U-shaped yoke providing a pair of depending support legs, a horizontal bar member with its axis in a position at right angles to the main plane of said yoke and having one end joined to the upper central portion of the yoke, the opposite end depending laterally and defining a third support leg situated in a position spaced from but midway between the first named support leg and provided at its opposite end with a bore opening through said opposite end and forming a socket, the top side of said bar member having recess means provided with graduations, a T-shaped member including a horizontal stem portion telescopically and slidably mounted in said socket and including a head at right angles to the stem and spaced outwardly from but in close proximity to the adjacent face of the yoke, and indicator means on said stem cooperating adjustably with the graduations, said head being adapted to abut a cooperating surface of the wheel which is to be checked.

CARL G. SIBBLE.

References Cited in the file of this patent

UNITED STATES PATENTS

| Number | Name | Date |
|---|---|---|
| 1,601,261 | Prather | Sept. 28, 1926 |
| 1,837,670 | Phelps | Dec. 22, 1931 |
| 2,036,895 | Tharp | Apr. 7, 1936 |
| 2,098,749 | Johnston | Nov. 9, 1937 |
| 2,381,276 | Greenleaf et al. | Aug. 7, 1945 |
| 2,434,205 | Fields | Jan. 6, 1948 |
| 2,508,849 | Williams | May 23, 1950 |
| 2,589,770 | Bullinger | Mar. 18, 1952 |